March 19, 1935.   W. H. PECK   1,994,531

OPTICAL SYSTEM

Filed March 26, 1932

INVENTOR
William H. Peck
BY
Pennie, Davis, Marvin & Edmonds
ATTORNEYS

Patented Mar. 19, 1935

1,994,531

UNITED STATES PATENT OFFICE 1,994,531

OPTICAL SYSTEM

William Hoyt Peck, Scarsdale, N. Y.

Application March 26, 1932, Serial No. 601,333

5 Claims. (Cl. 88—1)

This invention relates to apparatus for merging into a single concentrated beam, light from several distinct and spacially displaced sources.

The invention finds various applications in television systems, particularly in the receiving portion of such systems. As is well known, the neon tubes employed for reproducing the image in such systems do not in general produce white light, with the result that the image appears unreal. This defect can be overcome with my invention by employment of two neon tubes the predominating colors of which are complementary. Beams from these two sources upon being merged into a single beam in accordance with my invention can be made to produce substantially white light, or more generally one imparting to the image a desired soft and pleasing color tone.

My system finds particular application in color television. To this end two light sources of complementary colors may be used, or three light sources comprising the primary colors. The individual sources are suitably actuated during the scanning operation in accordance with the percentage and occurrence of the individual colors in the scanned object, with the result that the image is correspondingly blended.

The modern "crater" type neon tubes employed in producing the image are of such low impedance that they do not work efficiently from the relatively high output impedance of the vacuum tube amplifiers to which they are connected. The use of step-down transformers interposed between the amplifier and neon tube, by eliminating the direct current component removes the background intensity of the image, which is objectionable, and also introduces loss and distortion, the latter particularly at the lower and upper frequency limits.

With my construction the difficulties of matching impedances may be mitigated by connecting several neon tubes in series to the amplifier output. The illumination from these several sources being merged in accordance with my invention into a single beam provides a brightly illuminated image suitable for being projected onto a screen.

Generically the novel results of my invention are achieved by the use of a prism of triangular section relatively so positioned with respect to a light source that an entering beam falling upon one of its faces therefrom is directed toward the opposite face at a less than critical angle and hence is transmitted. A second light source is so positioned opposite the third face of the prism that the entering beam is totally reflected internally at the first face into substantial coincidence with the transmitted beam from the first source. In this way beams from the two sources converging upon the prism at an appreciable angle to one another are emitted therefrom in the same direction. By careful positioning of the light sources in relation to the faces of the prism, the emitted rays from the two sources may be merged into a single beam.

A refinement of this modification consists in the use of two prisms of the same or substantially the same proportions, preferably right prisms having two faces intersecting at ninety degrees. These prisms are arranged with their hypotenuses adjacent and set at a slight angle to one another, leaving thereby an air space between. The resultant sectional contour is substantially rectangular.

The angle between the adjacent faces of the two prisms is so selected that a beam directed in a substantially perpendicular direction upon an exposed face of one prism will pass through the assembly substantially undeviated by virtue of impinging upon all prism faces at a less than critical angle. At the same time a second beam impinging perpendicularly upon a face of the second prism set substantially at right angles to the first mentioned face, will impinge upon the hypotenusal face of that prism at a greater than critical angle and hence be totally reflected in the direction of the first beam. By careful positioning of the emitting light sources the two beams in question may be caused to coincide or merge upon passage through the prism assembly.

By employment of an assemblage of three prisms as hereinafter explained beams from three spacially displaced sources may thus be merged.

Referring now to the drawing.

Figure 3:
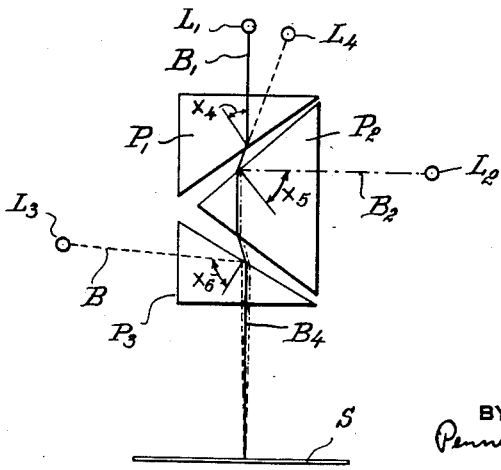

Fig. 3 illustates the modification employing three prisms and three sources of light.

Figure 1:
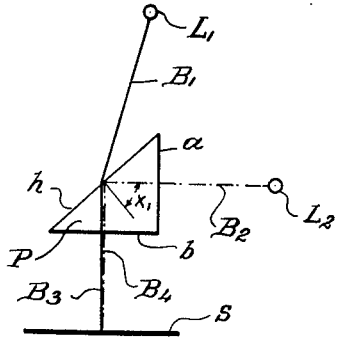
Fig. 1 illustrates the principle of my invention in its simplest form as applied to a single prism.

Referring to Fig. 1 a right prism P is positioned to receive light upon its hypotenuse $h$ from a first light source $L_1$; and to receive light upon a second face $a$ from a second source $L_2$. A beam $B_2$ from source $L_2$ enters the prism substantially perpendicular to face $a$ and hence undeviated. The entering beam $B_2$ impinges internally upon face $h$ at an angle $X_1$ greater than the critical angle. As a consequence the beam $B_2$ is totally reflected as beam $B_4$ emerging from the prism substantially perpendicular to face $b$ and hence undeviated at this face.

The beam $B_1$ from source $L_1$ impinging at an acute angle upon face $h$ is deviated into the transmitted beam $B_3$ which emerges substantially perpendicular to and hence undeviated at face $b$. By careful adjustment of the positions of sources $L_1$ and $L_2$ relative to the faces of the prism, entering beams $B_1$ and $B_2$ can be caused to emerge in substantial coincidence, as beams $B_3$ and $B_4$, and hence to illuminate the same area upon a screen S. Beams $B_3$ and $B_4$ are shown slightly displaced merely for purposes of clarity in illustration. In reality the beams coincide.

Figure 2:
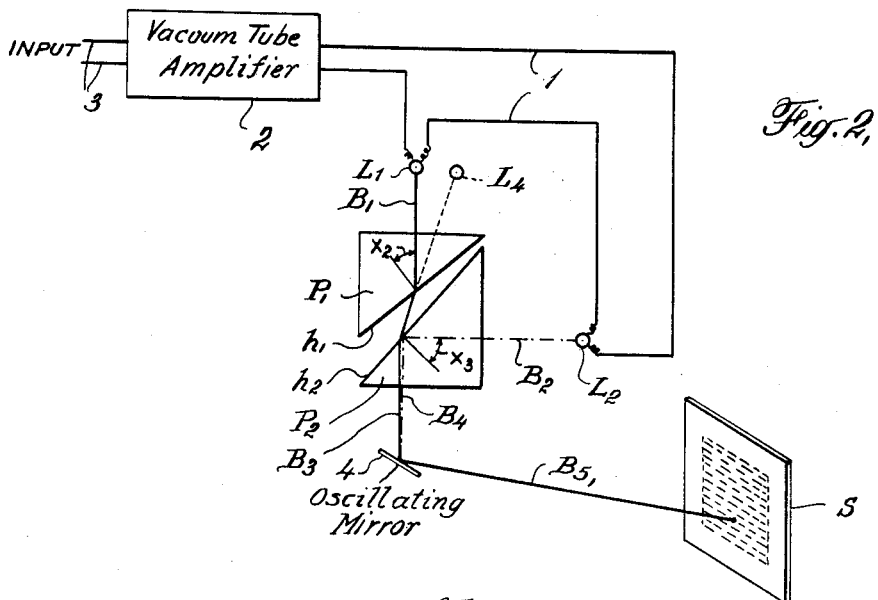
Fig. 2 shows the refinement employing two prisms.

Referring now to Fig. 2, two right prisms $P_1$ and $P_2$ of similar proportions are positioned with their faces $h_1$ and $h_2$ adjacent but separated and slightly inclined relative to one another. The relative inclination is such that a beam $B_1$ from source $L_1$ entering substantially perpendicular to a face of prism $P_1$ impinges upon face $h_1$ thereof at less than critical angle $X_2$, and hence is transmitted on through prism $P_2$ emerging as beam $B_3$ substantially undeviated in direction from the direction of the original beam $B_1$.

At the same time a second beam $B_2$ from source $L_2$ falling substantially perpendicularly upon a face of prism $P_2$ impinges internally upon face $h_2$ at greater than critical angle $X_3$ and is thus totally reflected as beam $B_4$ through the remaining face of the prism. Upon locating sources $L_1$ and $L_2$ as indicated, the beams $B_3$ and $B_4$ can be made to coincide by slightly shifting the prism assembly as well as the component prisms. Omission of prism $P_1$ would necessitate locating light source $L_1$ at $L_4$ indicated dotted.

Assuming light sources $L_1$ and $L_2$ to be low impedance "crater" type neon tubes employed in television receiving apparatus, they may be connected in series by means of conductors 1 to the output of a vacuum tube amplifier 2 adapted to amplify television signals impressed by any suitable means upon its input terminals 3. Employed in this fashion the resultant impedance of the neon tubes will more nearly match the output impedance of the amplifier. I thus attain a further object of my invention, namely, efficient conversion into light fluctuations of the amplified electrical television signals.

In television the merged beams $B_3$ and $B_4$, Fig. 2, are reflected by oscillating mirror 4 as a scanning beam $B_5$ traversing screen S in well known fashion for creating the image.

In Fig. 3 I show a combination of three prisms $P_1$, $P_2$ and $P_3$ arranged to merge beams $B_1$, $B_2$ and $B_3$ from sources $L_1$, $L_2$ and $L_3$ into a single beam $B_4$. The prisms are so formed and fitted together as to form an assembly of substantially rectangular contour. The angular inclinations of the opposed prism surfaces are such relative to the direction of beam $B_1$, that the latter is transmitted through the assembly substantially undeviated. Beams $B_2$ and $B_3$, however, entering the prism system at substantially right angles to the direction of $B_1$, are totally reflected internally at surfaces of their respective prisms and emerge in coincidence with beam $B_1$ to form the resultant beam $B_4$. To this end angle $X_4$ is made less than the critical angle; whereas angles $X_5$ and $X_6$ are greater than critical.

In Fig. 3 prism $P_1$ could be omitted provided light source $L_1$ were located at $L_4$.

The maximum number of beams which may be merged in this fashion is not limited to three. Additional beams may be included by directing them at an angle or perpendicular to the plane of the drawing Fig. 3.

I claim:

1. An optical system comprising a light source, a plurality of prisms arranged to transmit seriatum at less than critical angles a perpendicularly entering beam from said source, other light sources each so positioned opposite a face of a prism individual thereto that a perpendicularly entering beam from each such source is totally reflected internally at a greater than critical angle by the opposite face of the associated prism into substantial coincidence with said transmitted beam, whereby the separate beams from the several sources are merged.

2. An optical system comprising an assemblage of three prisms arranged with surfaces in opposed relation and slightly inclined relatively such that a beam directed perpendicularly upon an exposed surface of one said prism will be transmitted substantially undeviated at less than critical angles through said assemblage, whereas beams directed perpendicularly upon exposed surfaces of each of the other two prisms will be totally reflected internally at greater than critical angles into substantial coincidence with said transmitted beam, whereby beams from spacially displaced light sources may be merged.

3. An optical system comprising a plurality of prisms arranged with prismatic angles of alternate prisms oppositely disposed transversely of a given direction whereby a beam in said direction traverses said prisms seriatum, said prismatic angles being such that said beam traverses each prism at a less than critical angle, the first and last prism faces traversed by said beam being substantially parallel and perpendicular to said beam, a third prismatic face of certain of said prisms being so inclined to the faces of such prisms first traversed by said beam as to provide total internal reflection at greater than critical angles of beams impinging normally on said third faces, said reflected beams being reflected into substantial coincidence with said transmitted beam.

4. An optical system comprising a pair of prisms arranged roughly in the configuration of a parallelogram, said prisms being such that a first face of one prism and an adjacent face of the second prism are inclined to their respective hypotenusal faces at less and greater than critical angles respectively, whereby a beam impinging normally on said first face is transmitted substantially undeviated through said system, whereas a beam impinging normally upon said adjacent face is totally reflected internally into substantial coincidence with said transmitted beam.

5. An optical system comprising a pair of right prisms arranged with their hypotenusal faces opposed and slightly inclined relatively, said prisms being such that a first face of one prism and an adjacent face of the second prism are inclined to their respective hypotenusal faces at less than and greater than critical angles respectively, whereby a beam impinging normally on said first face is transmitted substantially undeviated through said prism, whereas a beam impinging normally upon said adjacent face is totally reflected internally into substantial coincidence with said transmitted beam.

WILLIAM HOYT PECK.